United States Patent Office 3,204,014
Patented Aug. 31, 1965

3,204,014
STABILIZATION OF POLYACETALS
Richard Green, Livingston, N.J., assignor, by mesne assignments, to Tenneco Chemicals, Inc., a corporation of Delaware
No Drawing. Filed Sept. 20, 1962, Ser. No. 225,114
15 Claims. (Cl. 260—895)

This invention relates to polyacetals and, more particularly, to the stabilization of high molecular weight polymers of formaldehyde.

High molecular weight polymers of formaldehyde have been developed recently that show great promise in the plastics industry. These polymers have a combination of physical properties, such as toughness, stiffness, and tensile strength, that make them useful in the manufacture of shaped articles, such as films, filaments, fibers, rods, tubes, and the like. These polyacetals, however are subject to considerable degradation at the high temperatures that are required in their processing or that may be encountered by the finished articles. They may also be degraded by chain cleavage resulting from oxidation or attack by acids. A number of materials, such as secondary and tertiary monomeric aromatic amines, superpolyamides, urea and thiourea, and hydroxyanthraquinones, have been suggested for use as stabilizers for high molecular weight polymers of formaldehyde, but none of these has proven to be entirely satisfactory for this purpose. Many of the known stabilizers do not provide the required stabilizing effect, while others impart color to the stabilized compositions.

In accordance with this invention it has been found that high molecular weight polymers of formaldehyde can be stablized against thermal degradation by incorporating in the polymer compositions a small amount of a stabilizer system comprising copolymer of vinylpyrrolidone, a phenolic antioxidant, and a dialkyl ester of 3,3'-thiodipropionic acid. The resulting polyacetal compositions are characterized by excellent thermal stability and by good color and color retention.

The copolymers of vinylpyrrolidone which may be used in the stabilizer system are copolymers resulting from the polymerization of a mixture of N-vinylpyrrolidone and any of a wide variety of monoolefinic monomers copolymerizable therewith. The useful comonomers include, for example, vinyl chloride, vinylidene chloride, vinyl acetate, vinyl propionate, vinyl butyrate, vinyl ethers, styrene, α-methylstyrene, acrylonitrile, methacrylonitrile, acrylic acid, methacrylic acid, maleic anhydride, alkyl acrylates, alkyl methacrylates, alkyl maleates, alkyl fumarates, alkyl crotonates, and the like. The comonomers are used in such proportions that the copolymers contain approximately 30% to 90% of N-vinylpyrrolidone units and 10% to 70% of units derived from the other monomer. The vinylpyrrolidone copolymers may be prepared by mass, solution, or emulsion polymerization procedures in the various manners well-known to the art.

The second component of the stabilizer system is a phenolic antioxidant having a structure represented by the formula

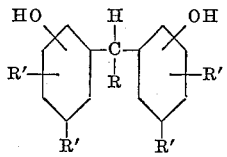

wherein R represents a hydrogen atom or an alkyl group having from 1 to 3 carbon atoms and each R' represents an alkyl group having from 1 to 4 carbon atoms. Illustrative of these compounds are the following: 2,2'-methylene bis (4-methyl-6-tert. butylphenol), 2,2'-methylene bis (4-ethyl-6-tert. butylphenol), 4,4'-butylidene bis (3-methyl-6-tert. butylphenol), 2,2'-butylidene bis (4,6-dimethylphenol), 2,2'-butylidene bis (4-tert. butyl-6-methylphenol), 2,2'-ethylidene bis (4-methyl-6-tert. butyl-phenol), 4,4'-methylene bis (2,6-di-tert. butylphenol), 6,6'-butylidene bis (2,4-xylenol), 4,4'-butylidene bis (2,5-xylenol), and the like. A single phenolic antioxidant or a mixture of two or more of these compounds may be present in the stabilizer system.

The dialkyl esters of 3,3'-thiodipropionic acid which may be used in combination with the vinylpyrrolidone copolymer and phenolic antioxidant have the formula

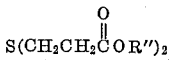

wherein each R" represents an alkyl group having a structure represented by from 8 to 20 carbon atoms, a cycloalkyl group, or a hydroxyalkyl group having from 1 to 4 carbon atoms. These esters include, for example, dioctyl 3,3'-thiodipropionate, didecyl 3,3'-thiodipropionate, diacetyl 3,3'-thiodipropionate, distearyl 3,3'-thiodipropionate, dieicosyl 3,3'-thiopropionate, lauryl stearyl 3,3'-thiodipropionate, dicyclohexyl 3,3'-thiodipropionate, di (4-ethylcyclohexyl) 3,3'-thiodipropionate, di (hydroxymethyl) 3,3'-thiodipropionate, di (hydroxyethyl) 3,3'-thiodipropionate and di (hydroxybutyl) 3,3'-thiodipropionate. The preferred esters are those in which R" represents an alkyl group having from 12 to 18 carbon atoms, such as dilauryl 3,3'-thiodipropionate, dicetyl 3,3'-thiodipropionate, and distearyl 3,3'-thiodipropionate.

The stabilized polyacetal compositions generally contain approximately 0.1% to 10% by weight of the stabilizer system based on the weight of the high molecular weight polymer of formaladehyde, with amounts of approximately 1% of 5% being preferred. The weight ratios of the three components comprising the stabilizer system can also be varied. The stabilizer system generally contains approximately 5 to 30 parts of the vinylpyrrolidone copolymer and 1 to 20 parts of the phenolic antioxidant per part of the thiodipropionate ester. The preferred ratio of stabilizer components is approximately 10 to 20 parts of the vinyl pyrrolidone copolymer and 2 to 5 parts of the phenolic antioxidant per part of the thiodipropionate ester. It is particluarly preferred to use approximately 15 parts of copolymer and approximately 3 parts of the phenolic antioxidant per part of the thiodipropionate ester.

The combination of vinylpyrrolidone copolymer, phenolic antioxidant, and dialkyl ester of 3,3'-thiodipropionic acid as herein described can be used to stabilize a wide variety of high molecular weight polymers of formaldehyde compositions against thermal degradation. Any of the normally solid, high molecular weight formaldehyde homopolymers and copolymers can be stabilized in accordance with this invention. As used herein, the term "high molecular weight polymer of formaldehyde" includes both linear and branched-chain homopolymers and copolymers of formaldehyde having a molecular weight in the range from about 15,000 to about 200,000 and a melting point in excess of 170° C., the predominant structural feature of both homopolymers and copolymers being the recurring oxymethylene units (—OCH$_2$—) in the polymer chain. Among the most important homopolymers are α,ω-polyoxymethylene glycol, α,ω-polyoxymethylene dicarboxylates (such as the diacetate or dipropionate), and α,ω-polyoxymethylene diethers (such as the methyl, ethyl, or β-hydroxyethyl ethers), all of which may have ω-substituted polyoxymethylene branched chains at one or more points in the main polymer chain. The formaldehyde copolymers include both linear and branched-chain polymers in which the recurring oxymethylene units (—OCH$_2$—) in the polymer chains are periodically or randomly interrupted by other oxyalkylene units containing two or more vicinal carbon atoms, or by other units introduced by copolymerizing other monomers, such as α-butyrolactone, phthalide or isocyanic acid, with substantially anhydrous formaldehyde or with it trimer, trioxane.

The stabilizer system may be incorporated into the high molecular weight polymers of formaldehyde in any convenient manner. One method for the preparation of the polyacetal compositions of this invention involves dissolving the stabilizer components in a volatile solvent, adding to the high molecular weight polymer of formaldehyde an amount of the solution that will provide the desired amount of the stabilizer in the composition, and removing the solvent by evaporation. Alternatively, the stabilized polyacetal compositions of the invention may be prepared by milling the dry solids together or by dissolving both the high molecular weight polymer of formaldehyde and the stabilizer system in a common solvent and then removing the solvent by evaporation.

The invention is further illustrated by the following examples. It is to be understood, however, that these examples are included merely for the purpose of illustration and that they are not to be construed as being limitative except as set forth in the appended claims. In this description and in the claims all proportions are by weight unless otherwise indicated.

EXAMPLE 1

A series of stabilized polyacetal compositions was prepared by the following procedure: To one part of polyoxymethylene diacetate (molecular weight—30,000) were added 1.5 parts of a 1% solution of a vinylpyrrolidone copolymer in acetone, 0.3 part of a 1% solution of 4,4'-butylidene bis (3-methyl-6-tert. butylphenol) in acetone, and 0.1 part of a 1% solution of dilauryl thiodipropionate in acetone. The resulting mixtures were air dried to remove the acetone. The thermal stabilities of each of the resultant polyacetal compositions was determined by heating the compositions in an oxidizing atmosphere at 222° C. for 30 minutes. At the end of this period the compositions were cooled to room temperature and weighed. The stabilizer systems which were used and the properties of the stabilized polyacetal compositions are given in Table I. For comparative purposes, this table also includes data on an unstabilized composition and on compositions which contained 2% of a vinylpyrrolidone copolymer as the sole stabilizer.

Table I

| Ex. No. | Stabilizer Components | | | Percent weight loss | Color |
|---|---|---|---|---|---|
| | Copolymer | Percent 4,4'-butylidene bis (3-methyl-6-tert. butylphenol) | Percent dilauryl thiodipropionate | | |
| 1A | 1.5% N-vinylpyrrolidone-vinyl acetate copolymer (30:70). | 0.3 | 0.1 | 0.95 | Light yellow |
| 1B | 1.5% N-vinylpyrrolidone-vinyl acetate copolymer (70:30). | 0.3 | 0.1 | 0.04 | Do. |
| 1C | 1.5% N-vinylpyrrolidone-acrylonitrile copolymer (90:10). | 0.3 | 0.1 | 0.5 | Yellow |
| 1D | 1.5% N-vinylpyrrolidone-acrylamide copolymer (90:10). | 0.3 | 0.1 | 0.4 | Light yellow |
| 1E | 2% N-vinylpyrrolidone-vinyl acetate copolymer (30:70). | 0 | 0 | 6.2 | Yellow |
| 1F | 2% N-vinylpyrrolidone-vinyl acetate copolymer (70:30). | 0 | 0 | 11.7 | Brown-yellow |
| 1G | 2% N-vinylpyrrolidone-acrylonitrile copolymer (90:10). | 0 | 0 | 8.9 | Deep yellow |
| 1H | 2% N-vinylpyrrolidone-acrylamide copolymer (90:10). | 0 | 0 | 7.3 | Yellow |
| 1I | None | 0 | 0 | 22.6 | |

From the data in Table I it will be seen that the compositions which contained the novel ternary stabilizer system were far more stable when heated in an oxidizing atmosphere than either the unstabilized compositions or the compositions which contained 2% of the vinylpyrrolidone copolymer as stabilizer. In addition, those compositions which contained the stabilizer system were lighter in color than those which contained approximately the same proportion of the vinylpyrrolidone copolymer.

EXAMPLE 2

A series of stabilized polyacetal compositions was prepared by adding to 1 part of polyoxymethylene diacetate (molecular weight—50,000) 1.5 parts of a 1% solution of a vinylpyrrolidone copolymer in acetone, 0.3 part of a 1% solution of 4,4'-butylidene bis (3-methyl-6-tert. butylphenol) in acetone, and 0.1 part of a 1% solution of dilauryl thiodipropionate in acetone. Following removal of the acetone by evaporation, the resultant compositions were heated in an oxidizing atmosphere at 222° C. for 30 minutes, cooled to room temperature, and weighed. The stabilizer systems which were used and the properties of the stabilized polyacetal compositions are given in Table II. For comparative purposes, this table also includes data on an unstabilized composition and on compositions which contained as stabilizer only the vinylpyrrolidone copolymer.

Table II

| Ex. No. | Stabilizer Components | | | Percent weight loss | Color |
|---|---|---|---|---|---|
| | Copolymer | Percent 4,4'-butylidene bis (3-methyl-6-tert. butylphenol) | Percent dilauryl thiodipropionate | | |
| 2A | 1.5% N-vinylpyrrolidone-ethyl acrylate copolymer | 0.3 | 0.1 | 3.0 | Light yellow |
| 2B | 1.5% N-vinylpyrrolidone-styrene copolymer | 0.3 | 0.1 | 11.1 | Light brown |
| 2C | 2% N-vinylpyrrolidone-ethyl acrylate copolymer | 0 | 0 | 36.0 | Light yellow |
| 2D | 2% N-vinylpyrrolidone-styrene copolymer | 0 | 0 | 33.8 | Brown |
| 2E | None | 0 | 0 | 35.6 | |

The polyacetal compositions of this invention may, if desired, contain other stabilizers, such as ultraviolet light absorbers, as well as plasticizers, fillers, pigments, solvents, dyes, etc., in the amounts ordinarily employed for the purposes indicated.

The stabilized polyacetal compositions may be converted to films, fibers, molded articles, and the like by melt-extrusion, injection-molding, compression-molding, and other fabrication methods known in the art.

What is claimed is:

1. A thermally stable polyacetal composition comprising a high molecular weight polymer of formaldehyde and containing from about 0.1% to about 10% by weight of a stabilizer system comprising (a) a copolymer resulting from the polymerization of a mixture of 30% to 90% by weight of N-vinylpyrrolidone and 10% to 70% by weight of a monoolefinic monomer copolymerizable therewith; (b) a phenolic antioxidant having the fomula

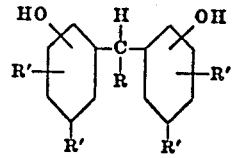

wherein R represents a member selected from the group consisting of a hydrogen atom and alkyl groups having from 1 to 3 carbon atoms and each R' represents an alkyl group having from 1 to 4 carbon atoms; and (c) a diester of 3,3'-thiodipropionic acid having the formula

wherein R" represents a member selected from the group consisting of alkyl groups having 8 to 20 carbon atoms, cyclo-alkyl groups, and hydroxyalkyl groups having to 1 to 4 carbon atoms in the amounts of approximately 5 to 30 parts by weight of said polyvinylpyrrolidone copolymer and 1 to 20 parts by weight of said phenolic antioxidant per part by weight of said thiodipropionic acid ester, all percentages except those designating the composition of the vinylpyrrolidone copolymer being based on the weight of the formaldehyde polymer in the polyacetal composition.

2. A thermally stable polyacetal composition comprising a high molecular weight polymer of formaldehyde and containing from about 1% to about 5% by weight of a stabilizer system comprising (a) a copolymer resulting from the polymerization of a mixture of 30% to 90% by weight of N-vinylpyrrolidone and 10% to 70% by weight of a monoolefinic monomer copolymerizable therewith; (b) a phenolic antioxidant having the formula

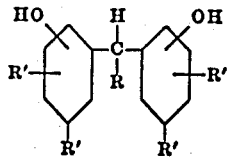

wherein R represents a member selected from the group consisting of a hydrogen atom and alkyl groups having from 1 to 3 carbon atoms and each R' represents an alkyl group having from 1 to 4 carbon atoms; and (c) a diester of 3,3'-thiodipropionic acid having the formula

wherein R" represents a member selected from the group consisting of alkyl groups having 8 to 20 carbon atoms, cycloalkyl groups, and hydroxyalkyl groups having 1 to 4 carbon atoms in the amounts of approximately 10 to 20 parts by weight of said polyvinylpyrrolidone copolymer and 2 to 5 parts by weight of said phenolic antioxidant per part by weight of said thiodipropionic acid ester, all percentages except those designating the composition of the vinylpyrrolidone copolymer being based on the weight of the formaldehyde polymer in the polyacetal composition.

3. A thermally stable polyacetal composition comprising polyoxymethylene diacetate having an average molecular weight of at least 20,000, as determined viscosimetrically, and containing from about 1% to about 5% of a stabilizer system comprising (a) a copolymer resulting from the polymerization of a mixture of 30% to 90% by weight of N-vinylpyrrolidone and 10% to 70% by weight of monoolefinic monomer copolymerizable therewith; (b) a phenolic antioxidant having the formula

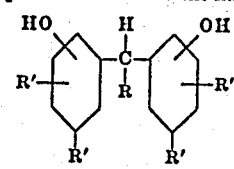

wherein R represents a member selected from the group consisting of a hydrogen atom and alkyl groups having from 1 to 3 carbon atoms and each R' represents an alkyl group having from 1 to 4 carbon atoms; and (c) a diester of 3,3'-thiodipropionic acid having the formula

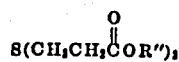

wherein R" represents a member selected from the group consisting of alkyl groups having 8 to 20 carbon atoms, cycloalkyl groups, and hydroxyalkyl groups having 1 to 4 carbon atoms in the amounts of approximately 10 to 20 parts by weight of said polyvinylpyrrolidone copolymer and 2 to 5 parts by weight of said phenolic antioxidant per part by weight of said thiodipropionic acid ester, all percentages except those designating the composition of the vinylpyrrolidone copolymer being based on the weight of the polyoxymethylene diacetate in the polyacetal composition.

4. The thermally stable polyacetal composition of claim 3 wherein the copolymer is a copolymer of N-vinylpyrrolidone and vinyl acetate.

5. The thermally-stable polyacetal composition of claim 3 wherein the copolymer is a copolymer of N-vinylpyrrolidone and acrylonitrile.

6. The thermally-stable polyacetal composition of claim 3 wherein the copolymer is a copolymer of N-vinylpyrrolidone and acrylamide.

7. The thermally-stable polyacetal composition of claim 3 wherein the copolymer is a copolymer of N-vinylpyrrolidone and styrene.

8. The thermally-stable polyacetal composition of claim 3 wherein the copolymer is a copolymer of N-vinylpyrrolidone and ethyl acrylate.

9. The thermally-stable polyacetal composition of claim 3 wherein the phenolic antioxidant is 4,4'-butylidene bis (3-methyl-6-tert. butylphenol).

10. The thermally-stable polyacetal composition of claim 3 wherein the diester of 3,3'-thiodipropionic acid is dilauryl 3,3'-thiodipropionate.

11. The thermally-stable polyacetal composition of claim 3 wherein the diester of 3,3'-thiodipropionic acid is distearyl 3,3'-thiodipropionate.

12. A thermally-stable polyacetal composition comprising polyoxymethylene diacetate having a number average molecular weight of at least 20,000, as determined viscosimetrically, and containing a stabilizer system comprising (a) approximately 1.5% of a copolymer resulting from the polymerization of a mixture of 30% to 90% by weight of N-vinylpyrrolidone and 10% to 70% by weight of a monoolefinic monomer copolymerizable therewith; (b) approximately 0.3% of 4,4'-butylidene bis (3-methyl-6-tert. butylphenol); and (c) approximately 0.1% of dilauryl thiodipropionate, all percentages except those designating the composition of the vinylpyrrolidone copolymer being based on the weight of the polyoxymethylene diacetate in the polyacetal composition.

13. The thermally-stable resinous composition of claim 12 wherein the copolymer is a copolymer of N-vinylpyrrolidone and vinyl acetate.

14. The thermally-stable resinous composition of claim 12 wherein the copolymer is a copolymer of N-vinylpyrrolidone and acrylonitrile.

15. The thermally-stable resinous composition of claim 12 wherein the copolymer is a copolymer of N-vinylpyrrolidone and acrylamide.

References Cited by the Examiner

UNITED STATES PATENTS

| | | | |
|---|---|---|---|
| 2,966,476 | 12/60 | Kralovec et al. | 260—45.9 |
| 3,033,814 | 5/62 | Tholstrup | 260—45.95 |
| 3,103,499 | 9/63 | Dolce et al. | 260—45.9 |

MURRAY TILLMAN, *Primary Examiner.*

WILLIAM H. SHORT, *Examiner.*

UNITED STATES PATENT OFFICE
CERTIFICATE OF CORRECTION

Patent No. 3,204,014  August 31, 1965

Richard Green

It is hereby certified that error appears in the above numbered patent requiring correction and that the said Letters Patent should read as corrected below.

Column 2, lines 5 and 6, for "butyl-phenol" read -- butylphenol --; lines 21 and 22, for "diacetyl" read -- dicetyl --; line 23, for "3,3′-thiopropionate" read -- 3,3′-thiodipropionate --; line 36, for "of" read -- to --; line 43, for "vinyl pyrrolidone" read -- vinylpyrrolidone --; line 46, after "of" insert -- the --; line 49, after "of" insert -- a --; line 53, strike out "compositions"; column 3, line 35, for "iigh" read -- high --; column 6, line 11, after "of" insert -- a --; line 31, for "polyvinylpyrrolidone" read -- N-vinylpyrrolidone --; line 39, for "thermally stable" read -- thermally-stable --.

Signed and sealed this 17th day of May 1966.

(SEAL)
Attest:

ERNEST W. SWIDER
Attesting Officer

EDWARD J. BRENNER
Commissioner of Patents